United States Patent [19]

Lee

[11] Patent Number: 4,974,210

[45] Date of Patent: Nov. 27, 1990

[54] MULTIPLE ARM ROBOT WITH FORCE CONTROL AND INTER-ARM POSITION ACCOMMODATION

[75] Inventor: Jin S. Lee, Voorhees Township, Camden County, N.J.

[73] Assignee: General Electric Company, Moorestown, N.J.

[21] Appl. No.: 345,315

[22] Filed: May 1, 1989

[51] Int. Cl.$^5$ ............................................. G06F 15/46
[52] U.S. Cl. .................................... 364/513; 364/163; 364/165; 901/9; 901/15; 901/45; 901/34
[58] Field of Search ............... 364/513, 163, 165, 148, 364/164, 161, 162; 901/9, 15, 45, 34

[56] References Cited

U.S. PATENT DOCUMENTS

| | | | |
|---|---|---|---|
| 4,761,595 | 8/1988 | Goor | 318/568 |
| 4,761,596 | 8/1988 | Nio et al. | 364/513 |
| 4,763,276 | 8/1988 | Perreirra et al. | 364/513 |
| 4,826,392 | 5/1989 | Hayati | 364/513 |
| 4,860,215 | 8/1989 | Seriji | 364/513 |

OTHER PUBLICATIONS

Coordinated Adaptive Position/Force Control of Dual-Arm Robots; International Journal of Robotics and Automation; pp. 140-149; vol. 3, No. 3, 1988; H. Seraji.

Adaptive Control Strategies for Cooperative Dual-Arm Manipulators; H. Seraji; Journal of Robotic Systems, 4 (5), 653-684 (1987).

"Experiments in Force Control of Robotic Manipulators", by Maples et al., pp. 695-702 of the Proceeding of the 1986 IEEE International Conference on Robotics and Automation.

"Hybrid Position/Force Control of Manipulators" by Railbert et al., pp. 419-438 of the text Robot Motion: Planning and Control, edited by Brady et al., published by MIT press, 1982.

"Multi-Arm Coordination and Force Control Using Position Accommodation"; by J. S. Lee, pp. 1937-1945 of the Proceedings of the Nineteenth Annual Pittsburgh Conference, May 1988, Modeling & Simulation, vol. 19, Part 5; Control, Robotics.

*Primary Examiner*—Allen MacDonald
*Attorney, Agent, or Firm*—William H. Meise

[57] ABSTRACT

A robot manipulator uses multiple robot arms to grasp and move an object. The object is moved by the coordinated motion of the arms. Because of inaccuracies in the coordinated motion of the arms due to mechanical inaccuracies or to imperfections in the model used by the controller to evaluate the interaction of the arms with the environment, the actual motion of the arms may be slightly uncoordinated. This may result in the application of unwanted forces to the object which may distort or break the object, the arms, or both. A multiarm accommodation arrangement evaluates the forces applied by the arms to the object to determine the net forces, and generates position accommodation signals which are summed with the several mutually coordinated arm control signals to tend to cause the forces applied to the object to be zero or a desired finite value. In a particular embodiment of the invention, an outer loop provides position accommodation to control forces applied by the object to an external load.

7 Claims, 3 Drawing Sheets

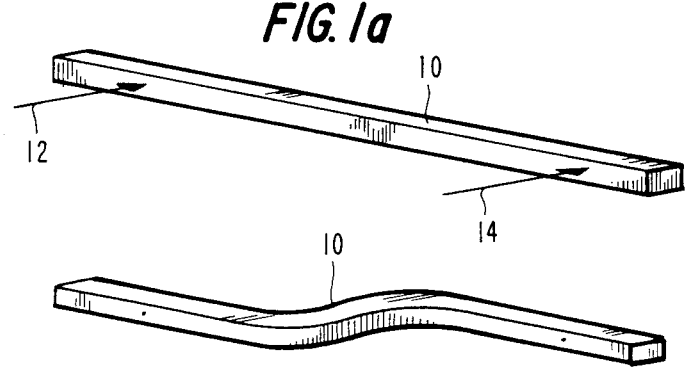
FIG. 1a
FIG. 1b
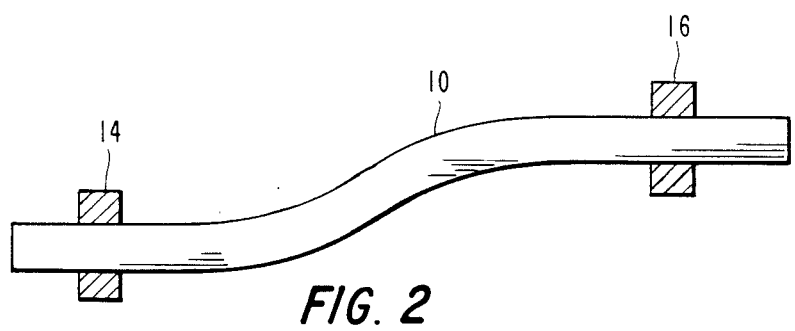
FIG. 2

MULTIPLE ARM ROBOT WITH FORCE CONTROL AND INTER-ARM POSITION ACCOMMODATION

BACKGROUND OF THE INVENTION

Robotic arms are widely used in some industries for assembly work, welding, painting and the like. In a typical operation, a single robot arm carries a tool such as a paint sprayer or welding head to various portions of a workpiece under the control of a microprocessor. For some operations, such as for example a spray-painting operation, it is sufficient for the controller to command the robot arm to traverse a predetermined trajectory in space which is known to be at a selected distance from the surface of the workpiece being painted. In such a situation, the, robot arm only needs to carry the spray head, and does not need to come into contact with the workpiece.

A robot arm for welding, on the other hand, not only carries the welding head, but must move the welding head into contact with the workpiece, and further, must often press the welding head against the workpiece with a predetermined force. For such an operation, it is desirable to use not only position control, but also force control. Combined position/force control is described, for example, in "Experiments In Force Control Of Robotic Manipulators" by Maples et al., published at pages 695–702 of the Proceedings of the 1986 IEEE International Conference on Robotics and Automation, and in a chapter entitled "Hybrid Positions/Force Control of Manipulators" by Raibert et al., which appeared at pages 419–438 of the text "Robot Motion: Planning and Control" edited by Brady et al., and published by MIT press, 1982. The systems described in the above articles use force sensors to determine the forces being applied by the arms, and the Maples et al. article describes conversion of the forces to position accommodation signals which modify the basic position control to maintain the desired force.

When robots are used for moving objects from one location to another location, it is found that certain objects are not readily adaptable to being manipulated by a single robot arm or manipulator. For example, the insertion of the end of a long, relatively massive steel pipe into a fixed hole or receptacle is very difficult with a single arm. If the arm grasps the object away from the center of gravity, its mass causes large torques to be generated which tend to mask the force sensor signals resulting from insertion forces, thereby making force control difficult to implement. Also, the free end of the object tends to whip or oscillate, which makes insertion of the free end into a receptacle very difficult. A more natural way of picking up and manipulating long objects is to pick them up at or near each end with a coordinated pair of robotic arms. This reduces the torques necessary at a particular arm, and allows the application of a moment to the object by the application of force alone at each of two locations. The use of multiple robotic arms for coordinated movement is, however, subject to a certain amount of inaccuracy due to errors in the control models which describe the interaction of the robot arms with the surrounding space and the object being manipulated.

The nature of these errors can be readily understood by considering a simple example. In the example, a rectangular block is held between the ends of two robot arms, which press against the opposed ends of the block with a certain amount of force as a result of the positions of the robot arms having been selected with an inter-arm spacing slightly less than the dimensions of the block. Consequently, the block is slightly compressed. Each of the two arms is controlled independently, but the control signals are coordinated and synchronized for a desired motion which lifts the block from a table and transports it to a remote location. Thus, the block is held by the pressure of the two arms on its sides. If simple position control of each arm is used, the block will continue to be held so long as the inter-arm separation does not deviate significantly from that originally established. However, if the inter-arm separation should, due to the inaccuracies in the coordinated motion of the arms, exceed the dimension between the end faces of the block, even for a moment, the block will fall. Thus, position control of the arms for the described use requires tracking, which is never exact. On the other hand, if the separation between the arms decreases between that originally established, the forces exerted on the block will increase, and if the increase in force is substantial this may result in breakage of the object or of one of the robot arms.

An obvious way to control two arms for coordinated control would be to use two independent but coordinated hybrid position/force controllers, each similar to one of the Maples et al. or Rarbeit et al. controllers. This has the advantage of simplicity. However, even though the arms act independently, they are coupled together by the forces acting through the object being manipulated, since both arms are holding the same object. This adversely affects the dynamic response of both controls, because the sensing of a force results in two independent actions to relieve the force. This tends to cause at least an overreaction to the applied force and may cause oscillation. This can be prevented by increasing the damping, but the damping tends to make the system slow to respond.

These highly simplified examples merely give a flavor for the kinds of problems which can arise in the control of coordinated arms. Actual robotic arms ordinarily include grippers for gripping the device, and further include one or more wrist joints, which complicate the control, and which furthermore allow the application of various types of bending or tension to the object, in addition to compression. An example of a more sophisticated type of action might be the problem of "placing the peg in the hole", which is the grasping of an elongated rod near its ends by a pair of arms terminated in gripping devices, and the coordinated motion of the arms for transporting the rod and for insertion of the end of the rod into a matching hole. FIG. 1a illustrates an elongated rectangular bar 10 which is gripped by grippers (not illustrated) at locations 12 and 14 in such a manner that both torques and forces may be applied. After translation with the above-described inaccuracies, the bar may take the form illustrated in FIG. 1b, which includes the results of both torques and forces. In FIG. 2, an originally straight bar 10 is seen in elevation view. In FIG. 2, the bar is illustrated as being gripped by first and second gripper sets 14 and 16. In the illustrated position, grippers 14 and 16 have a vertical offset therebetween which results from inaccuracies in the control. As can be seen, bar 10 is substantially distorted even by this simple error. In an actual operating system, such errors, if accumulated, could result in stresses which might damage or break the workpiece or the robot.

A controller is desired for controlling multiple arms in a coordinated fashion.

SUMMARY OF THE INVENTION

A method for applying force to or moving an object by the coordinated motion of first and second arms includes the step of generating object position command signals representing the desired position trajectory of the object. The method also includes generating first and second arm position command signals from the object position command signals, taking into account the offsets of the arms relative to the object. The first and second arms are controlled at least partially in response to the first and second arm position command signals, respectively. As a result of imperfections in the control of the arms, they may not be fully coordinated, and as a result unwanted forces may be applied to the object. The forces applied by the first and second arms to the object are used to produce first and second arm actual force signals, which represent forces applied to the object by the arms. Object force bias command signals are generated, which are representative of the forces which it is desired to apply to the object from the arm, which object force bias signals may be of zero magnitude. The difference is taken at least between the first and second arm actual force signals and the object force bias command signals to produce inter-arm force error signals. Inter-arm incremental position accommodation signals are generated from the inter-arm force error signals, which inter-arm incremental position accommodation signals represent an incremental position accommodation required of the first and second arms acting independently or differentially to reduce the magnitude of the error signal. The inter-arm incremental position accommodation signals are divided into first and second portions applicable to the first and second arms, respectively, to produce signals which are summed with the first and second arm position command signals, for providing position accommodation among or between the arms for causing the forces applied by the arm to the object to track the object force bias command signals.

DESCRIPTION OF THE DRAWING

FIG. 1a illustrates a straight elongated rod or bar and two gripping points, and FIG. 1b illustrates the bar in a distorted condition;

FIG. 2 is an elevation view of the bar of FIG. 1a together with grippers which cause distortion of the bar through a vertical offset;

DESCRIPTION OF THE INVENTION

Figure 3:
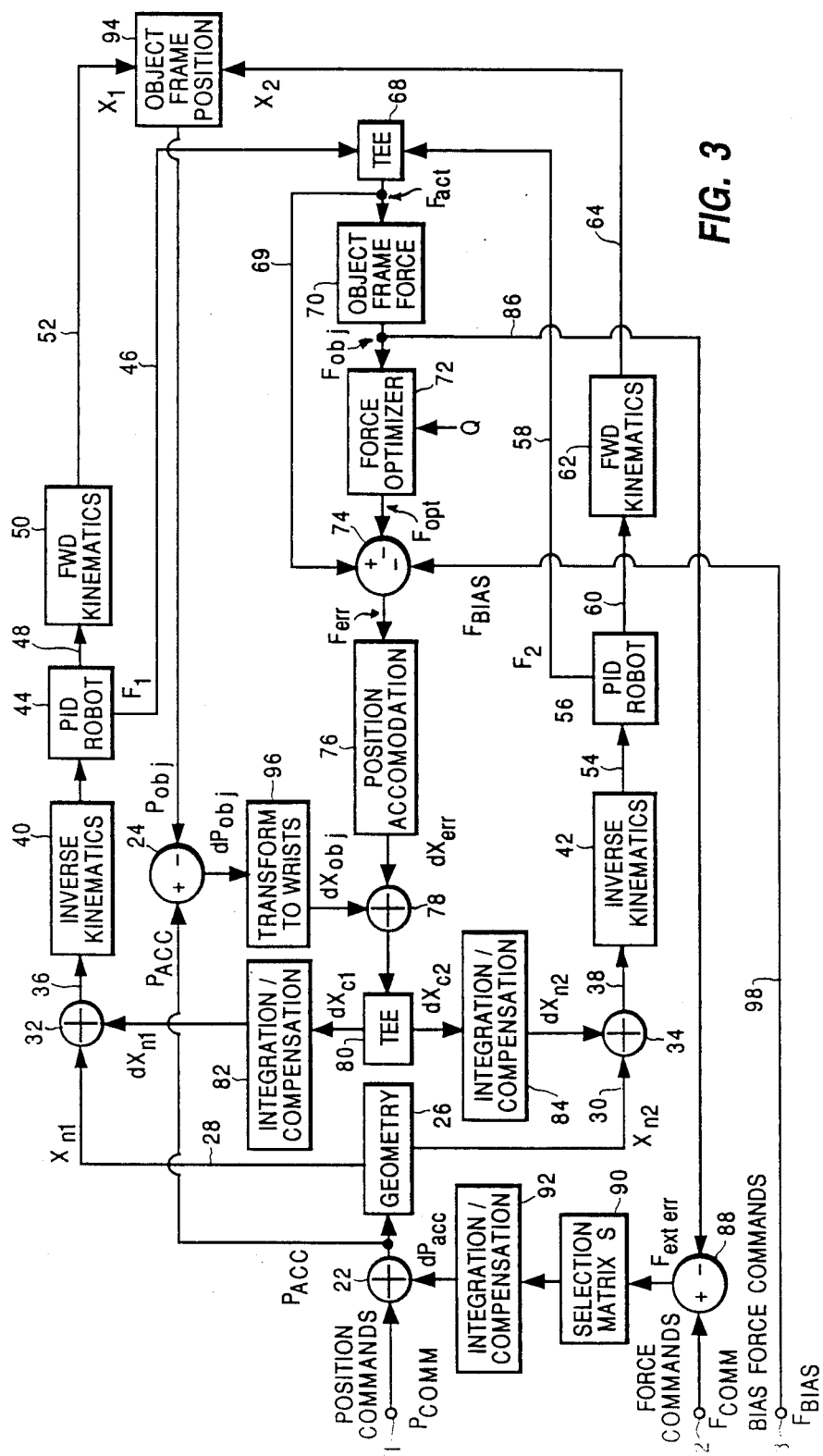
FIG. 3 is a simplified block diagram of a control system in accordance with the invention.

In FIG. 3, position command signals $P_{comm}$ in Cartesian coordinates are applied from a source (not illustrated) to an input terminal set 1. The position command signals are, in the general case, in the form of a $6 \times 1$ matrix, each element of which represents by its amplitude the position or orientation to be assumed by a reference point on the object being manipulated. Any or all elements of the matrix may change from moment to moment, representing the positions to be sequentially assumed by the reference point on the object being manipulated. Naturally, for less complex motions, as for example for the control of position above, fewer matrix elements than six are required. The position command signals are applied from input terminal set 1 to summer or adding circuit illustrated as 22. Those skilled in the art know that serial digital signals may be carried over a single conductor (and its associated return), while parallel data is carried simultaneously over multiple conductors. Hereinafter, terminal or conductor sets will be described as though they were single terminals or conductors for simplicity. In summer 22, the position command signals $P_{comm}$ are summed, as described below, with incremental position signals to produce accommodated position commands $P_{acc}$.

In FIG. 3, force command signals $F_{comm}$ in the form of a $6 \times 1$ matrix are applied from a source (not illustrated) to an input terminal 2. The force command signals represent, from moment to moment, the forces which are desired between the object being manipulated and an external load. It should be noted that the external load may press on the object, or the object may press on the external load, these having the same effect. Such an external load might be, for example, the immovable wall in which a receptacle is formed in the above-mentioned peg-in-hole problem, where the object being manipulated is urged against the wall to generate forces between the wall (load) and the object.

As described further below, the incremental position accommodation signals (which are summed with the position command signals $P_{comm}$ in summer 22) represent the accommodations of position of two arms acting together or in concert to maintain the force between the external load and the object being moved at or near the value determined by force command signals $F_{comm}$ applied to input terminal 2.

The accommodated position commands $P_{acc}$ are applied from summing circuit 22 to a further differencing circuit 24 and to a geometry block 26. Block 26 computes the position which the first and second arms must assume from moment to moment based upon the commanded position of the object being manipulated as modified by the incremental position signals for force accommodation, to produce accommodated first arm signals $X_{n1}$ and accommodated second arm position signals $X_{n2}$, which are made available on conductors 28 and 30, respectively. In effect, the circuit of block 26 simply subtracts the distance from the reference point on the object being manipulated to the associated gripper (if any) at the end of the each arm, and takes into account the rotational position, if relevant, by resolving the homogeneous transformation, and translates the signal to conductors 28 and 30, ultimately for control of the arm to place the gripper in a position which will result in the reference point on the object being at the commanded location.

The accommodated arm position control signals $X_{n1}$ and $X_{n2}$ are applied from conductors 28 and 30, respectively, to further summing circuits 32 and 34, respectively, in which the accommodated arm position signals $X_{n1}$ and $X_{n2}$ are summed with inter-arm position accommodation signals $dX_{n1}$ and $dX_{n2}$ as described below. The resulting accommodated arm position control signals are generated by summing circuits 32 and 34 on conductors 36 and 38. The arm position control signal on conductor 36 is applied to coordinate conversion circuitry illustrated as an inverse kinematics block 40, which converts the signals from a Cartesian coordinate system to wrist or joint position information for actual control of the robot. The converted signal is applied to the proportional, integral and differential control (PID) first robot arm, which is represented by a block 44.

Robot arm 44 includes one or more force sensors (not illustrated) which may have as many as six degrees of freedom (three forces and three torques), depending upon the intended use of the robot, for generating force-representative signals F1 on a conductor 46. In the simple example mentioned above of the block held by pressure between two arms, robot arm 44 might have only one force sensor indicating the pressure applied between robot arm 44 and one end or the block, which corresponds to one degree of freedom. Robot arm 44 also includes position sensors (not illustrated) which produce joint-based position signals on a conductor 48, which position signals are applied to a further coordinate conversion circuit illustrated as a forward (fwd) kinematics block 50 for converting the joint-based position signals to Cartesian-coordinate-based position signals $X_1$ on a conductor 52.

Similarly, the Cartesian-coordinate-based accommodated arm position control signals applied to conductor 38 from summing circuit 34 are converted to joint-based control signals by an inverse kinematics block 42. The joint-based control signals appearing on conductor 54 are applied to a PID robot arm illustrated as a block 56. Robot arm 56 includes force sensors (not illustrated) which produce force-representative signals $F_2$ on conductor 58 with as many as six degrees of freedom. Also, arm 56 includes position sensors (not illustrated) which produce joint-based position signals on a conductor 60, which joint position signals are applied through a forward kinematics block 62 to produce Cartesian-coordinate-based position signals $X_2$ on conductor 54.

From robot arm 44, force signal $F_1$ in the form of a $6 \times 1$ force vector matrix is applied over conductor 46 to a tee block 68. From robot arm 56, force signal F2, also in the form of a $6 \times 1$ force vector matrix, is applied over conductor 58 to tee block 68. Tee block 68 converts the F1 and F2 $6 \times 1$ force vector matrices into a single $12 \times 1$ force matrix $F_{act}$ which appears on a conductor 69. The combination of arm forces represented by the vector matrix $F_{act}$ on conductor 69 may act solely upon the object and not upon the external loads, or it may also include components which act upon an external load by way of the object. The force matrix $F_{act}$ is applied from tee 68 by way of conductor 69 to an object frame force calculation block 70 which converts the signals from an arm-based coordinate system to an object coordinate system. Object frame force calculator 70 produces signals on a conductor 86 which represent, in part, the forces applied by way of the object to an external load, but referenced to the object coordinate system.

In general, $$\text{if } F_1 = \begin{pmatrix} f_1 \\ m_1 \end{pmatrix} \text{ and } F_2 = \begin{pmatrix} f_2 \\ m_2 \end{pmatrix} \tag{1}$$

where $f_i$ is the force component of arm i, $$\begin{pmatrix} fx \\ fy \\ fz \end{pmatrix}_i$$

and $m_i$ is the moment component of arm i, $$\begin{pmatrix} mx \\ my \\ mz \end{pmatrix}_i$$

then the equivalent force if exerted in the coordinate system or frame of the object is $$C_{Fi} = \begin{pmatrix} I & 0 \\ D_i & I \end{pmatrix} \begin{pmatrix} R & O_{iT}^T \\ 0 & R_i \end{pmatrix} \tag{2}$$

where
$CF_i$ represents the equivalent object forces $$F_i = \begin{pmatrix} fi \\ mi \end{pmatrix},$$

$R_i$ is the matrix representing rotation from arm i to the object,
the superscript T represents the transpose of the matrix,
I is the identity matrix.
and $$D_i = \begin{pmatrix} 0 & -z & y \\ z_i & 0 & -x_i \\ -y_i & x_i & 0 \end{pmatrix} \tag{2a}$$

where ($x_i$, $y_i$, $z_i$) is defined as a vector from arm i to the object.

The total force exerted by the gripper, expressed in the object frame, is $$F_{obj} = C_{F1} + C_{F2} = [C_1 C_2] \begin{bmatrix} F_1 \\ F_2 \end{bmatrix} = W F_{act} \tag{3}$$

As mentioned above, force commands $F_{comm}$ in Cartesian coordinates are applied by way of input terminal 2 to the noninverting input of a differencing circuit 88. The force-representative signals produced on conductor set 86 are applied to the inverting input of differencing circuit 88. Differencing circuit 88 produces an external force error signal $F_{ext\ err}$, which is applied to a selection matrix (S) illustrated as a block 90. Selection matrix 90 multiplies the $6 \times 1$ $F_{ext\ err}$ signal from differencing circuit 88 by a diagonal matrix, the elements of which may be ones or zeroes. Where an element of the S matrix is zero, that particular component of external error force $F_{ext\ err}$ is multiplied by zero, and does not contribute toward accommodating a component of position command, whereby that particular force component of $P_{acc}$ remains unaffected. When the S matrix component is unity, the corresponding component of $F_{ext\ err}$ is applied to an integration and compensation circuit illustrated as a block 92, which integrates the error over time for smooth dynamic performance. Block 92 also compensates to produce incremental coordinated or overall position accommodation signals $dP_{acc}$ which are summed with position command signals $P_{comm}$ in summing circuit 22. The incremental overall position accommodation signals $dP_{acc}$ represent the incremental change in position away from the commanded position which must be executed by both arms moving jointly or in concert in order to cause the forces which are applied by the object being manipulated to the external load to match the commanded force. The incremental position accommodation signal, which is part of accommodated position command signal $P_{acc}$, is then partitioned by geometry circuit 26 and applied as part of signal $X_{n1}$ and $X_{n2}$ for control of the robot arms 44 and 54 in a closed-loop fashion.

The signals representing the forces applied to the object by the arms, as processed and translated to the object frame by block 70 and appearing on conductor set 86, are also applied to a force optimization block illustrated as 72. Force optimization block 72 examines the forces applied to the object and determines how the arm forces should be rearranged to reduce the cost of maintaining computed object forces. The forces applied to the object could in general be generated in many ways, as by generating a small net object force in response to the difference between two large, mutually opposed arm forces. Generating a small object force as the difference of two large arm forces would be costly in terms of some parameter such as the amount of power required to maintain the forces, or such as the maximum amount of force allowable in certain arms, or other like parameters. Block 72 computes a 12×1 arm force vector F which minimizes the optimization criterion $F^TQF$ while maintaining the object force $F_{obj}$ at the object frame. In order to perform the optimization, block 72 requires an input, denominated Q, which represents the weighting matrix. For example, the user can place in Q higher costs on moments as compared to forces.

The desired distribution of forces among (or between) the arms in block 76 is formulated as an optimization in which the desired optimum force distribution $$F_{opt} = Q^{-1}W^T[WQ^{-1}W^T]^{-1}F_{obj} \tag{4}$$

minimizes the cost $F^TQF$ subject to the constraint $WF = F_{obj}$. For the simple case of a small force resulting from two large, mutually opposed forces, the optimized forces would be zero in one direction and the net value in the other direction.

The optimized force representative signals $F_{opt}$ are applied from force optimization block 72 to an inverting input of a summing circuit 74. In circuit 74, the optimized force signal $F_{opt}$ is subtracted from signal $F_{act}$ representing the actual arm forces applied to the object to, in general, produce at an output of summing circuit 74 a force error signal $F_{err}$ which represents the excess of the actual arm forces over that which is required to maintain the same arm forces in a more optimal manner. The error signal $F_{err}$ is then applied to a position accommodation calculation block 76 which calculates the inter-arm position accommodation (independent or differential arm motion) required to reduce the force error $F_{err}$ towards zero in a closed loop. Thus, referring to FIG. 2, assuming that the force error was represented by a downward force required to hold gripper 14 in the illustrated position and an equal upper force required to hold gripper 16 in the illustrated position, position accommodation block 76 would calculate that an increment of motion upward for gripper 14 and downward for gripper 16 would reduce the net force error.

Position accommodation block 76 uses a stiffness model defined by a 12×12 object/arm stiffness matrix K. Given $$F_{err} = \begin{pmatrix} df1 \\ dm1 \\ df2 \\ dm2 \end{pmatrix} \tag{6}$$

where $df_i$ = force error components of arm i, $$\begin{pmatrix} dfx \\ dfy \\ dfz \end{pmatrix}_i$$

and $d_{mi}$ = moment error components of arm i, $$\begin{pmatrix} dmx \\ dmy \\ dmz \end{pmatrix}_i$$

and also given $$dX_{err} = \begin{pmatrix} dX1 \\ d\phi1 \\ dX2 \\ d\phi2 \end{pmatrix} \tag{7}$$

where
$dX_i$ = incremental translation or accommodation components corresponding to the force error, and
$d\phi_i$ = incremental rotation or accommodation components corresponding to the force error,
then $$F_{err} = KdX_{err} \tag{8}$$

By inverting equation (8), the incremental arm displacement $dX_{err}$ providing the required force correction is determined. It is noted that 12×12 matrix K is in general singular in the sense that determinant of K is zero. However, because of the constrained geometry of the robot/object system, which forms a closed kinematic chain, additional constraints can be obtained:

$$A \, dX_{err} = 0 \tag{9}$$

Combining equations (8) and (9), $$\begin{pmatrix} K \\ A \end{pmatrix} dX_{err} = F_{err} \tag{10}$$

where $$\begin{pmatrix} K \\ A \end{pmatrix}$$

is of full rank in the sense that the column vectors of $$\begin{pmatrix} K \\ A \end{pmatrix}$$

are mutually independent.

Inverting equation (10), $$dX_{err} = \left[ (K^T A^T) \begin{pmatrix} K \\ A \end{pmatrix} \right]^{-1} [K^T A^T] \begin{bmatrix} F_{err} \\ 0 \end{bmatrix} \quad (11)$$

$$dX_{err} = (K^T K + A^T A)^{-1} K^T F_{err} \quad (12)$$

As described above, for some cases, as for example the very simple example of two arms holding a block by compressing it therebetween, it would be desirable to be able to specify a residual force to be applied by the arms to the object even when the compensating loop is closed. For this purpose, a further inverting input is associated with summing circuit 74. A further input terminal 3 is provided for receiving inter-arm force bias command signals $F_{bias}$ representing the residual forces to be applied to the object. Terminal 3 is connected by way of a conductor set 98 to the further inverting input terminal of summing circuit 74. When the loop is closed as described hereinafter, the $F_{bias}$ input results in a requirement for an actual force to be applied by robot arms 44 and 56 to the object, which will result in a finite value of $F_{act}$ on conductor set 69 which will offset the value of $F_{bias}$ on conductor set 98 and satisfy the loop constraints. In other words, the magnitude of $F_{bias}$ applied to input terminal set 3 results in the application of corresponding forces by the arms to the object.

The position accommodation signals produced by position accommodation calculation block 76 are applied as the principal input to a summing circuit 78. As described below, a further incremental adjustment is added in summing circuit 78. The output of summing circuit 78 is apportioned between (or among) the arms by a distribution tee 80, which is similar to tee 68. Tee 80 routes the inter-arm incremental position accommodation signal $dx_{c1}$ to an integration and compensation block illustrated as 82 to produce a incremental position accommodation signal $dx_{n1}$ which is summed with the overall position accommodated signal $X_{n1}$ in summing circuit 32. Similarly, that portion of the inter-arm position accommodation error signal $dx_{err}$ applicable to robot arm 56 is applied as $dx_{c2}$ by way of an integration/compensation circuit illustrated as a block 84, and corresponding in function to block 82, to summing circuit 34. This closes a loop which controls the forces applied differentially by the arms to the object in order to maintain the net forces on the object itself at the values commanded by the $F_{bias}$ command.

As so far described, the control system responds to position commands applied to input terminal set 1 for causing both arms to move together in a coordinated fashion. When an external load is applied to the object being moved, the system responds by producing error signals at the output of difference circuit 88 which cause overall position accommodation of both arms operating in a coordinated manner to track the force commands applied to input terminal set 2. Errors in the positioning of the arms may result in incremental motion differences between the arms which imposes undesired forces from the object. These are accommodated by independent or differential motions of the arms caused by differential position signals superimposed upon the arm control signals in summing circuits 32 and 34.

In some cases, the inter-arm force accommodation may contribute toward small errors in the positioning of the object. In order to correct these errors, the Cartesian-coordinate-based position signals $X_1$ and $X_2$ are applied from robot arms 44 and 56 over conductor sets 52 and 64, respectively, to a block 94, which represents calculation of the location of the reference point on the object based upon the known spacing between each robot arm and the reference point on the object being manipulated.

The signals produced by object frame position block 94 are applied to the inverting input of differencing circuit 24, where they are subtracted from the overall force-accommodated signal $P_{acc}$ to produce an incremental object position correction signal $dP_{obj}$. The differential object position signal $dP_{obj}$ is applied to a further block 96 which performs a coordinate transformation from Cartesian coordinates to the wrists of the robot arms, and produces a signal $dx_{obj}$ which is summed with inter-arm position accommodation signal $dx_{err}$ in summing circuit 78. This tends to correct the object position by distributing the object error correction between the two arms.

Figure 4:
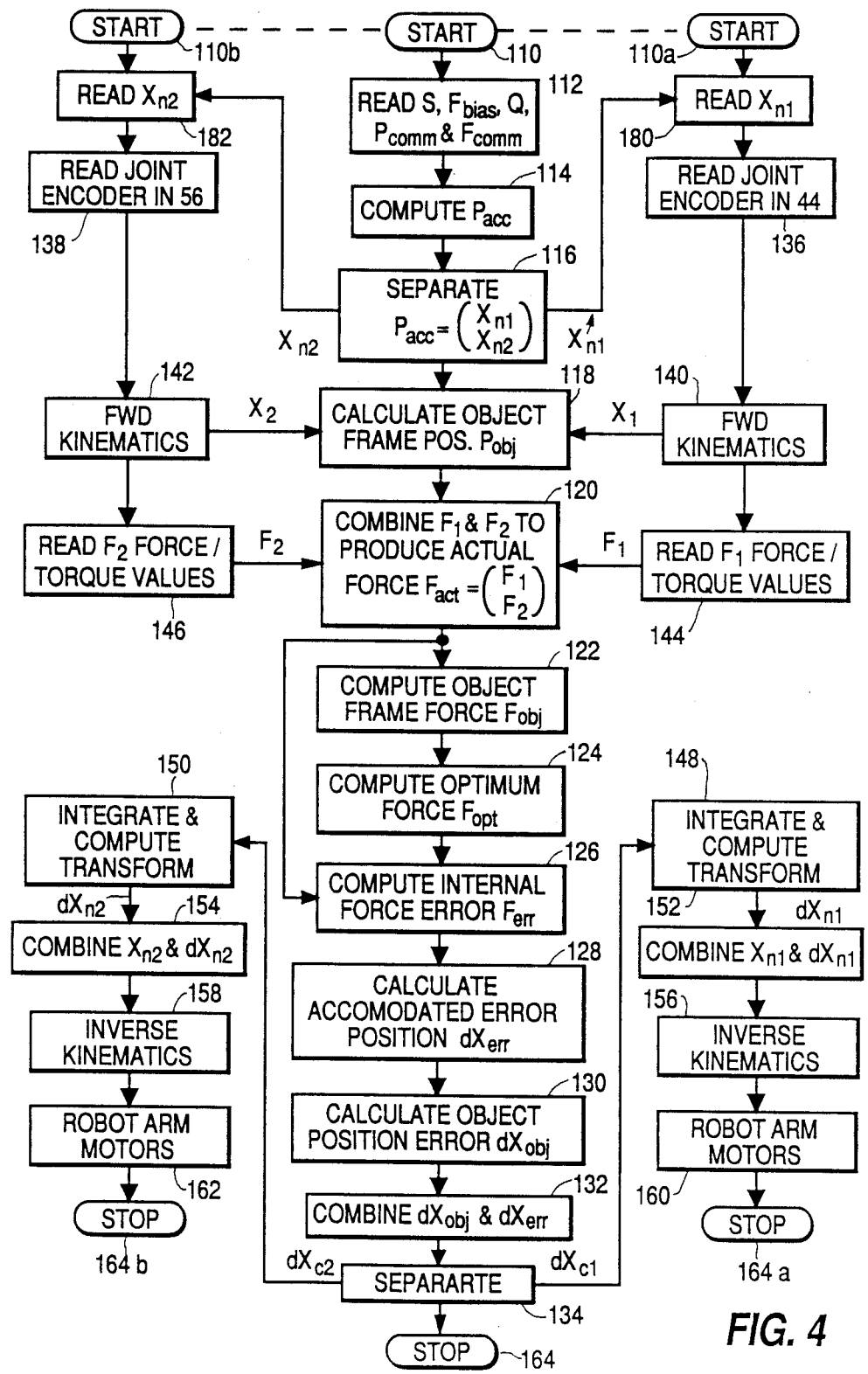
FIG. 4 is a simplified flow chart describing a mode of operation of the control system of FIG. 3.

FIG. 4 is a simplified flow chart describing control of the robot by the structure of FIG. 3. The flow structure represented by FIG. 4 may be considered to include three calculation paths, one for each arm (at the right and left of FIG. 4) and a main calculation path (at the center of FIG. 4). In FIG. 4, the calculations recur periodically, as by beginning at START blocks 110, 110a and 110b every 20 milliseconds. From START block 110a, the logic flows to a block 180, which represents a wait until a value of $X_{n1}$ is available, and a reading of $X_{n1}$. From START block 110b, the logic flows to a block 182, which represents a reading of $X_{n2}$ when the value becomes available. From START block 110, the logic flows to a block 112, which represents the reading of the selection matrix S, the commanded bias force $F_{bias}$, cost input Q the commanded position $P_{comm}$, and the commanded force $F_{comm}$. The logic then flows to a block 114, representing the calculation of the accommodated position $P_{acc}$. Block 116 represents the separation of $P_{acc}$ into a part attributable to each arm, $X_1$ and $X_2$, namely $X_{n1}$ and $X_{n2}$, respectively. When $X_{n1}$ and $X_{n2}$ become available, the calculations begin in the right and left paths. Block 118 represents the calculations performed by block 94 in the apparatus of FIG. 3. Calculation of the object frame position in block 118 of FIG. 4 requires preliminary or antecedent readings and calculations for each robot arm. For robot 44 (FIG. 3), the intermediate steps are provided by blocks 136 (read robot joint encoders) and 140 (forward kinematics calculation) of FIG. 4. For robot 56 in FIG. 3, the corresponding blocks in FIG. 4 are 138 and 142. From block 118, the logic flows to block 120, which represents the combination of $F_1$ and $F_2$ in Tee 68 of FIG. 3 to produce actual force vector matrix $F_{act}$. Ancillary calculations of $F_1$ and $F_2$ are represented by blocks 144 and 146 in FIG. 4.

From block 120 of FIG. 4, the logic flows to a block 122, representing calculation of the object frame force $F_{obj}$, which corresponds to the calculations performed by block 76 of FIG. 3. Block 124 represents computation of optimum force $F_{opt}$. The internal force error $F_{err}$ is calculated in block 126. Block 128 represents the calculation in block 126. Block 128 represents the calculation of accommodated error position $dX_{err}$, and block 130 represents calculation of object position error $dX_{obj}$. The combination of $dX_{obj}$ and $dX_{err}$ to produce a combined signal is represented by block 132. Block 134 represents the division or separation of the combined signal into portions $dX_{c1}$ and $dX_{c2}$ attributable to each robot. Block 134 represents the last step for the main calculation path, which ends at STOP 164.

For each robot, $dX_c$ is integrated and the transform $dX_n$ is computed (blocks 148 and 150) to produce an incremental position, and the current arm position $X_n$ is combined with the increment $dX_n$ (blocks 152 and 154), the inverse kinematics are calculated (blocks 156 and 158), and finally the arm motion signal is applied to each arm (blocks 160, 162). The arm control paths then stop at STOP blocks 164a and 164b, and the entire procedure starts again at start blocks 110, 110a and 110b after a predetermined time.

Other embodiments of the invention will be apparent to those skilled in the art. For example, the system as described may be implemented in either hardware or software form, or by a hybrid of software and hardware.

WHAT IS CLAIMED IS:

1. A method for applying force to or moving an object by the coordinated motion of first and second robotic arms, comprising the steps of:

generating object position command signals representing the desired position trajectory of a reference point on said object;

generating first arm actual force signals representing the forces applied by said first arm to the object;

generating second arm actual force signals representing the forces applied by said second arm to said object;

generating object force signals from said first and second arm actual force signals, said object force signals being representative of at least the net forces on said object applied by said first and second arms;

generating first arm position command signals at least in part from said object position command signals, said first arm position command signals commanding motion of said first arm, taking into account the offset of said first arm relative to said reference point;

generating second arm position command signals at least in part from said object position command signals, said second arm position command signals commanding motion of said second arm, taking into account the offset of said second arm relative to said reference point;

controlling the position of said first arm at least partially in response to said first arm position command signals;

controlling the position of said second arm at least partially in response to said second arm position command signals, whereby as a result of imperfections the motion of said arms may not be fully coordinated and as a result the commanded forces may not be achieved;

generating object force bias command signals representative of the forces which it is desired to apply to said object from said arms which are not transferred to an external load, which object force bias signals may be of zero magnitude;

generating object optimum force command signals at least in part from said object force signals, said object optimum force command signals being representative at least in part of the optimized forces which it is desired to apply to said object from said arms;

adding together said object force bias command signals and said object optimum force command signals to produce a sum command signal;

taking the difference between at least said object force signals and said sum command signals to produce inter-arm force error signals;

generating inter-arm incremental position accommodation signals from said inter-arm force error signals, said inter-arm incremental position accommodation signals representing an incremental position accommodation required of said first and second arms acting independently to reduce the magnitude of said inter-arm force error signal;

dividing said inter-arm incremental position accommodation signals into first and second portions applicable to said first and second arms, respectively, to produce first arm incremental position accommodation signals and second arm incremental position accommodation signals; and summing said first arm incremental position accommodation signal with said first arm position command signals and said second arm incremental position accommodation signals with said second arm position command signals for providing position accommodation between said arms for causing the forces applied by said arms to said object to track said object force bias command signals.

2. A method according to claim 1 further comprising the steps of:

generating external force command signals representing the desired forces to be applied by said arms to an external load by way of said object;

subtracting said object force signals from said object force command signals to produce an external force error signal representative of the difference between the commanded forces and the actual forces applied by said object to an external load;

generating common accommodation signals by at least integrating a portion of said external force error signal, said common accommodation signals representing the incremental motion required of said two arms acting in concert for reducing said external force error signal to cause the force applied by said object to said external load to track said external force command signals; and summing said common accommodation signals with said object position command signals to produce overall accommodated object position command signals.

3. A method according to claim 2 further comprising the steps of:

monitoring the positions of said first and second arms to produce first and second arm position signals, respectively;

generating object position signals from said first and second arm position signals!s, said object position signals representing the position of said reference point on said object;

taking the difference between said object position signals and said overall accommodated object position command signals to produce differential object position signals;

summing said differential object position signals with said inter-arm incremental position accommodation signals to provide compensation of said forces applied by said object to said external load in response to said steps of (a) generating object force bias command signals, (b) taking the difference, (c) generating inter-arm incremental position accommodation signals, (d) dividing, and (e) summing.

4. A method for applying force to or moving an object by the coordinated motion of first and second robotic arms, comprising the steps of:

generating object position command signals representing the desired position trajectory of a reference point on said object;

generating external force command signals representing the desired forces to be applied by said arms to an external load by way of said object;

monitoring the forces applied by said first arm to the object to produce first arm actual force signals;

monitoring the forces applied by said second arm to said object to produce second arm actual force signals;

generating object force signals from said first and second arm actual force signals, said object force signals being representative of the forces on said object applied by said first and second arms;

subtracting said object force signals from said object force command signals to produce an external force error signal representative or the difference between the commanded forces and the actual forces applied by said object to an external load;

generating common accommodation signals from said external force error signal, said common accommodation signals representing the incremental motion required of said two arms acting in concert for reducing said external force error signal to cause the force applied by said object to said external load to track said external force command signals;

summing said common accommodation signals with said object position command signals to produce accommodated object position command signals;

generating first arm position command signals from said accommodated object position command signals, said first arm position command signals commanding motion of said first arm, taking into account the offset of said first arm relative to said reference point;

generating second arm position command signals from said accommodated object position command signals, said second arm position command signals commanding motion of said second arm, taking into account the offset of said second arm relative to said reference point;

controlling the position of said first arm at least partially in response to said first arm position command signals;

controlling the position of said second arm at least partially in response to said second arm position command signals;

from said object force signals generating optimum object force signals representing object forces;

generating object force bias command signals representative of the forces which it is desired to apply to said object from said arms which are not transferred to an external load, which object force bias signals may be of zero magnitude;

taking the difference between said optimum object force signals, and the sum of said first and second arm actual force signals and said object force bias command signals to produce inter-arm force error signals;

generating inter-arm incremental position accommodation signals from said inter-arm force error signals, said inter-arm incremental position accommodation signals representing an incremental position accommodation required of said first and second arms acting independently to reduce the magnitude of said inter-arm force error signal;

dividing said inter-arm incremental position accommodation signals into first and second portions applicable to said first and second arms, respectively, to produce first arm incremental position accommodation signals and second arm incremental position accommodation signals; and summing said first arm incremental position accommodation signal with said first arm position command signals and said second arm incremental position accommodation signals with said second arm position command signals for providing position accommodation between said arms.

5. A method according to claim 4 further comprising the steps of:

monitoring the positions of said first and second arms to produce first and second arm position signals, respectively;

generating object position signals from said first and second arm position signals, said object position signals representing the position of said reference point on said object; and summing said object position signal and said overall accommodation signals with said inter-arm incremental position accommodation signals.

6. A method for applying force to or moving an object by the coordinated motion of first and second robotic arms, comprising the steps of:

generating object position command signals representing the desired position trajectory of a reference point on said object;

generating external force command signals representing the desired forces to be applied by said arms to an external load by waY of said object;

monitoring the forces applied by said first arm to the object to produce first arm actual force signals;

monitoring the forces applied by said second arm to said object to produce second arm actual force signals;

generating object force signals from said first and second arm actual force signals, said object force signals being representative of the forces on said object applied by said first and second arms;

subtracting said object force signals from said object force command signals to produce an external force error signal representative of the difference between the commanded forces and the actual forces applied by said object to an external load;

generating common accommodation signals from said external force error signal, said common accommodation signals representing the incremental motion required of said two arms acting in concert for reducing said external force error signal to cause the force applied by said object to said external load to track said external force command signals;

summing said common accommodation signals with said object position command signals to produce accommodated object position command signals;

generating first arm position command signals from said accommodated object position command signals, said first arm position command signals commanding motion of said first arm, taking into account the offset of said first arm relative to said reference point;

generating second arm position command signals from said accommodated object position command signals, said second arm position command signals commanding motion of said second arm, taking into account the offset of said second arm relative to said reference point;

controlling the position of said first arm at least partially in response to said first arm position command signals;

controlling the position of said second arm at least partially in response to said second arm position command signals, whereby as a result of imperfections the motion of said arms may not be fully coordinated and as a result the commanded forces may not be achieved;

from said object force signals, generating optimum object force signals, representing object forces which together define the desired object force components on each robot arm;

generating object force bias command signals representative of the forces which it is desired to apply to said object from said arms which are not transferred to an external load, which object force bias signals may be of zero magnitude;

taking the difference between said optimum object force signals, said first and second arm actual force signals and said object force bias command signals to produce inter-arm force error signals;

generating inter-arm incremental position accommodation signals from said inter-arm force error signals, said inter-arm incremental position accommodation signals representing an incremental position accommodation required of said first and second arms acting independently to reduce the magnitude of said inter-arm force error signal;

dividing said inter-arm incremental position accommodation signals into first and second portions applicable to said first and second arms, respectively, to produce first arm incremental position accommodation signals and second arm incremental position accommodation signals; and summing said first arm incremental position accommodation signal with said first arm position command signals and said second arm incremental position accommodation signals with said second arm position command signals for providing position accommodation between said arms for causing the forces applied by said arms to said object which are not transferred to said external load to track said object force bias command signals.

7. A method according to claim 6 further comprising the steps of:

monitoring the positions of said first and second arms to produce first and second arm position signals, respectively;

generating object position signals from said first and second arm position signals, said object position signals representing the position of said reference point on said object; and taking the difference between said object position signals and said overall accommodated object position command signals to produce differential object position signals;

summing said differential object position signals with said inter-arm incremental position accommodation signals provide compensation of said forces applied by said object to said external load in response to said steps of (a) generating optimum object force signals, (b) generating object force bias command signals, (c) taking the difference, (d) generating inter-arm incremental position accommodation signals, (e) dividing, and (f) summing.

* * * * *